W. S. CHILIS.
Combined Grocers' Scoop and Funnel.
No. 220,576.    Patented Oct. 14, 1879.
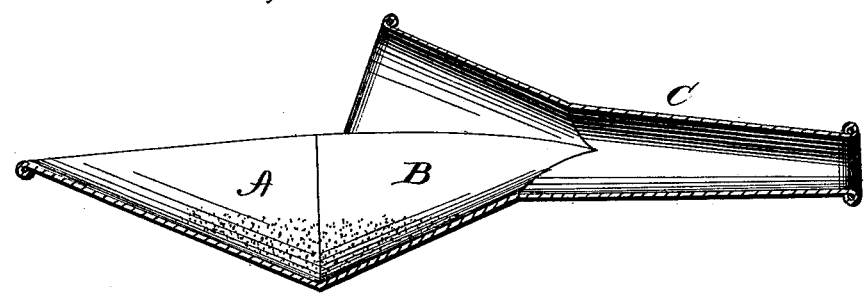
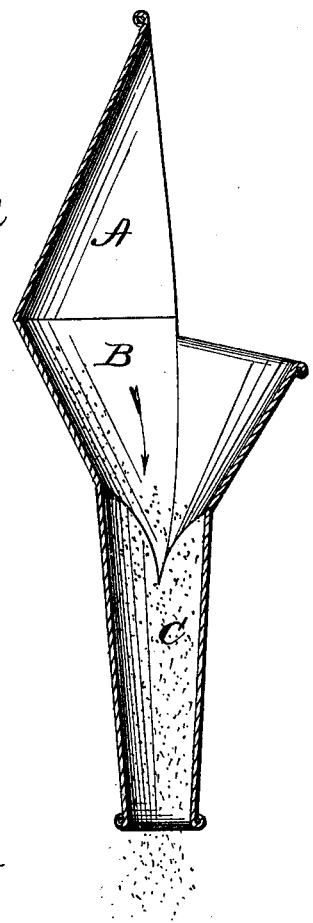

UNITED STATES PATENT OFFICE.

WILLIAM S. CHILIS, OF FORKLAND, ALABAMA, ASSIGNOR OF ONE-HALF OF HIS RIGHT TO CHARLES S. EDWARDS, OF SAME PLACE.

IMPROVEMENT IN COMBINED GROCER'S SCOOP AND FUNNEL.

Specification forming part of Letters Patent No. 220,576, dated October 14, 1879; application filed September 1, 1879.

*To all whom it may concern:*

Be it known that I, WILLIAM S. CHILIS, of Forkland, in the county of Greene and State of Alabama, have invented certain new and useful Improvements in Combined Grocer's Scoop and Funnel; and do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in scoops for grocers, druggists, feed-dealers, and other merchants and tradesmen, whereby any granulated, powdered, or other similar substance may be conveniently handled and transferred from one receptacle to another; and it consists of a scoop constructed of any suitable material with a shovel-shaped front and a funnel-shaped rear, the latter being provided with a hollow tapering handle, which may be inserted in the mouth of a bag or other receptacle to discharge the contents of the scoop therein.

In the drawings, Figure 1 represents a sectional view of the scoop in position to hold any substance, and Fig. 2 a similar view of the scoop in position to discharge the same.

The letter A indicates the front of the scoop, which is shovel-shaped, and B the funnel-shaped rear. To the apex of the funnel-shaped rear is attached a handle, C, which may be inserted in the mouth of a bag or other receptacle to discharge the contents of the scoop therein.

The scoop may be stamped up complete out of metal, or the parts may be separately formed and connected together in any suitable manner.

The operation of my invention will be readily understood without further explanation.

I am aware that a flour-sifting scoop and funnel has been used, whereby the flour in its passage through the scoop has been agitated and sifted; but this would be impracticable for the general grocery trade; hence my invention.

Having thus described my invention, what I claim is—

A scoop for grocers, druggists, and other merchants, consisting of a shovel-shaped front and a funnel-shaped rear, having a hollow handle through which its contents may be discharged, substantially as specified.

In testimony that I claim the foregoing I have hereunto set my hand this 1st day of August, 1879.

WILLIAM S. CHILIS.

Witnesses:
 THOS. W. ROBERTS,
 CHAS. H. BEVILLE.